US009748066B2

(12) United States Patent
Matsumoto et al.

(10) Patent No.: US 9,748,066 B2
(45) Date of Patent: Aug. 29, 2017

(54) FUSE UNIT ATTACHMENT STRUCTURE

(71) Applicant: Yazaki Corporation, Minato-ku, Tokyo (JP)

(72) Inventors: Yusuke Matsumoto, Makinohara (JP); Tatsuya Aoki, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/072,595

(22) Filed: Mar. 17, 2016

(65) Prior Publication Data

US 2016/0196947 A1 Jul. 7, 2016

Related U.S. Application Data

(63) Continuation of application No. PCT/JP2014/074887, filed on Sep. 19, 2014.

(30) Foreign Application Priority Data

Sep. 20, 2013 (JP) .................................. 2013-195776

(51) Int. Cl.
*H01H 85/20* (2006.01)
*H01H 85/044* (2006.01)
(Continued)

(52) U.S. Cl.
CPC ...... *H01H 85/2045* (2013.01); *H01H 85/044* (2013.01); *H01H 85/20* (2013.01);
(Continued)

(58) Field of Classification Search
CPC ......... H01H 85/044; H01H 2085/0555; H01H 2085/025; H01H 85/20; H01H 85/2045;
(Continued)

(56) References Cited

U.S. PATENT DOCUMENTS 2,729,802 A * 1/1956 Jordan ................. H01R 11/287
439/217
5,034,620 A * 7/1991 Cameron ................ B60R 16/04
180/282
(Continued)

FOREIGN PATENT DOCUMENTS

JP    H05-015297 U    2/1993
JP    2008-155746 A   7/2008
(Continued)

OTHER PUBLICATIONS

Oct. 21, 2014—International Search Report—Intl App PCT/JP2014/074887.
(Continued)

*Primary Examiner* — Anatoly Vortman
(74) *Attorney, Agent, or Firm* — Banner & Witcoff, Ltd.

(57) ABSTRACT

A fuse unit attachment structure includes a fuse bracket to be mounted on a fuse unit directly attachable to a battery and a bracket connecting member for connecting the fuse bracket to the battery. The fuse bracket has a unit supporting portion to support the fuse unit so as to be movable in a direction perpendicular to a lateral surface of the battery and a connecting member engaging portion to be engaged with the bracket connecting member so as to be movable in a direction along the lateral surface of the battery.

3 Claims, 16 Drawing Sheets

(51) Int. Cl.
*H01M 2/30* (2006.01)
*H01M 2/34* (2006.01)
*H01H 85/055* (2006.01)
*H01H 85/02* (2006.01)

(52) U.S. Cl.
CPC ............ *H01M 2/30* (2013.01); *H01M 2/348* (2013.01); *H01H 2085/025* (2013.01); *H01H 2085/0555* (2013.01); *H01M 2200/103* (2013.01)

(58) Field of Classification Search
CPC ... H01M 2/30; H01M 2/348; H01M 2200/103
USPC .......................................... 337/186, 207–209
See application file for complete search history.

(56) References Cited

U.S. PATENT DOCUMENTS

| | | | | |
|---|---|---|---|---|
| 5,645,448 | A * | 7/1997 | Hill | H01H 85/205 439/522 |
| 6,294,978 | B1 * | 9/2001 | Endo | H01H 85/044 337/159 |
| 6,509,824 | B2 * | 1/2003 | Inaba | H01H 85/044 29/623 |
| 6,576,838 | B2 * | 6/2003 | Matsumura | H01H 85/044 174/135 |
| 7,176,780 | B2 * | 2/2007 | Iwata | H01H 85/044 337/161 |
| 7,192,319 | B1 * | 3/2007 | Rahman | H01H 85/044 439/766 |
| 7,663,466 | B1 * | 2/2010 | Jetton | H01H 85/044 337/186 |
| 8,968,028 | B2 | 3/2015 | Onoda | |
| 2002/0163416 | A1 * | 11/2002 | Matsumura | H01H 85/044 337/112 |
| 2004/0008503 | A1 * | 1/2004 | Higuchi | H01H 85/044 361/833 |
| 2005/0285709 | A1 * | 12/2005 | Matsumura | H01H 85/044 337/227 |
| 2009/0061291 | A1 * | 3/2009 | Ohashi | B60R 16/04 429/65 |
| 2010/0019572 | A1 | 1/2010 | Kudo et al. | |
| 2014/0094062 | A1 | 4/2014 | Onoda | |

FOREIGN PATENT DOCUMENTS

| | | |
|---|---|---|
| JP | 2009-289602 A | 12/2009 |
| JP | 2010-033774 A | 2/2010 |
| JP | 2010-040367 A | 2/2010 |
| JP | 2010-129315 A | 6/2010 |
| JP | 2010-192329 A | 9/2010 |
| JP | 2011-222248 A | 11/2011 |
| JP | 2014-075222 A | 4/2014 |

OTHER PUBLICATIONS

Oct. 21, 2014—(WO) Written Opinion of the ISA—App PCT/JP2014/074887, Eng Tran.

* cited by examiner

000# FUSE UNIT ATTACHMENT STRUCTURE

CROSS REFERENCE TO RELATED APPLICATIONS

This application is a continuation of International Patent Application No. PCT/JP2014/074887 filed on Sep. 19, 2014, claiming priority from Japanese Patent Application No. 2013-195776 filed on Sep. 20, 2013, the contents of which are incorporated herein by reference.

FIELD OF INVENTION

The present invention relates to a fuse unit attachment structure.

BACKGROUND ART

FIG. 15 is a perspective view illustrating a structure for attaching, to a battery, a fuse unit directly attachable to a battery disclosed in JP2008-155746A. FIG. 16 is an exploded perspective view illustrating a structure for attaching, to a battery, a fuse unit directly attachable to the battery similar to the one shown in FIG. 15.

In FIGS. 15 and 16, a battery terminal 110 is fastened to a battery post 210 of a battery 200. A fuse unit 120 directly attachable to the battery is electrically connected to the battery post 210 via the battery terminal 110.

The battery terminal 110 includes, as shown in FIG. 16, a post fastening section 111 to be fastened to the battery post 210 and a fuse unit mounting section 112 to fasten the fuse unit 120 in a threaded manner.

The post fastening section 111 has a structure including a post insertion hole 111a into which the battery post 210 is inserted, a slit 111b forming a partially separated structure of the post insertion hole 111a, and a fastening screw 111c for fixing the post fastening section 111 to the battery post 210 by narrowing the slit 111b when tightened.

The fuse unit mounting section 112 is configured such that a stud bolt 112b is provided upright on a conductive plate portion 112a provided integrally with the post fastening section 111. The stud bolt 112b is provided such that the extending direction of its center axis line C1 is parallel to the direction of the center axis line C2 of the post insertion hole 111a of the post fastening section 111.

FIG. 17 illustrates a state in which the battery terminal 110 is mounted on the battery post 210 of the battery 200 in a proper mounting direction. The proper mounting direction of the battery terminal 110 is a direction in which the straight line L1 connecting the center of the post insertion hole 111a and the center of the stud bolt 112b is perpendicular to the lateral surface 201 of the battery 200 as shown in FIG. 17.

The fuse unit 120 includes a terminal connection section 121 having a terminal connection conductor 121a to be fastened to the fuse unit mounting section 112 and electrically connected to the battery post 210 via the battery terminal 110 and a resin housing 122 accommodating a plurality of connection terminals and fuses that are connected to the terminal connection conductor 121a in a branched manner.

The resin housing 122 includes a terminal accommodating section 122a accommodating the plurality of connection terminals connected to the terminal connection conductor 121a in a branched manner. Electric wires receiving electric power from the battery 200 are connected to the connection terminals accommodated in the terminal accommodating section 122a. The plurality of fuses provided between the terminal connection conductor 121a and the connection terminals are accommodated in a fuse accommodating section 122b.

The resin housing 122 accommodating the plurality of fuses and connection terminals is provided in a shape that extends downward perpendicularly from the end section of the terminal connection conductor 121a. As shown in FIG. 17, when the fuse unit 120 is properly mounted on the battery terminal 110 that is mounted on the battery post 210 in the proper mounting direction, the resin housing 122 is disposed along the lateral surface 201 of the battery 200, whereby the protruding amount from the battery 200 is suppressed.

However, according to the attachment structure described above, when the mounting direction of the battery terminal 110 is inclined by an angle θ from the proper mounting direction as shown in FIG. 18, there is a risk that the resin housing 122 of the fuse unit 120 may hit the lateral surface 201 of the battery 200 so that the fuse unit 120 may be damaged.

As a countermeasure for preventing such a drawback, the structure of the battery terminal 120 itself or the structure of the fuse unit 120 itself may be modified such that the fuse unit 120 does not hit the battery 200. However, such a countermeasure requires the battery terminal or the fuse unit to be newly designed and has a problem in that the prevention of the hitting cannot be made for existing products.

SUMMARY OF INVENTION

Illustrative aspects of the present invention provide a fuse unit attachment structure in which a fuse unit directly attachable to a battery to be connected to a battery post of the battery via a battery terminal is prevented from hitting a lateral surface of the battery without modifying a structure of an existing battery terminal or fuse unit directly attachable to the battery.

(1) According to an illustrative aspect of the present invention, a fuse unit attachment structure includes a fuse bracket configured to be mounted on a fuse unit directly attachable to a battery, the fuse unit configured to be connected to a battery terminal to be fastened to a battery post of the battery such that a portion of the fuse unit is disposed on a side of a lateral surface of the battery, and a bracket connecting member configured to connect the fuse bracket to the battery. The fuse bracket includes a unit supporting portion configured to support the battery directly attaching type fuse unit such that the fuse unit directly attachable to the battery is movable in a direction perpendicular to the lateral surface of the battery and a connecting member engaging portion configured to engage with the bracket connecting member so as to be movable in a direction along the lateral surface of the battery. The bracket connecting member includes a guide plate portion configured to engage with the connecting member engaging portion to support the fuse bracket such that the fuse bracket is movable in the direction along the lateral surface of the battery and a battery connection portion configured to engage with an engaging portion provided on a top surface of the battery around a post arranging section of the battery on which the battery post is arranged such that a movement of the battery connection portion in a direction along the top surface of the battery is restricted.

(2) The engaging portion on the top surface of the battery may be an existing mounting hole provided on the top surface of the battery to mount a post cover that covers an upper portion of the battery post.

(3) The unit supporting portion may include a pair of first guide grooves with which respective sides of a terminal connection section of the fuse unit directly attachable to the battery to be connected to the battery terminal are engaged such that the respective sides of the terminal connection section are slidable in the direction perpendicular to the lateral surface of the batter. The connecting member engaging portion may include a pair of second guide grooves with which the guide plate portion of the bracket connecting member provided in a protruding manner is engaged such that the guide plate portion is slidable in the direction along the lateral surface of the battery.

According to the configuration of (1) described above, the fuse unit directly attachable to the battery connected to the battery terminal is positioned on the battery by the fuse bracket mounted on the fuse unit and by the bracket connecting member for connecting the fuse bracket to the battery. Moreover, with the configuration of (1) described above, when the mounting direction of the battery terminal is inclined from the proper mounting direction, the movement direction of the fuse unit connected to the battery terminal is restricted by the engagement between the unit supporting portion of the fuse bracket and the fuse unit and by the engagement between the guide plate portion of the bracket connecting member and the fuse bracket.

Hence, the moving operation of the fuse unit directly attachable to the battery accompanied by the inclination of the battery terminal becomes a parallel movement operation with respect to the lateral surface of the battery while the fuse unit maintains the same mounting posture as that obtained when the mounting direction of the battery terminal is proper, whereby the fuse unit is prevented from hitting the lateral surface of the battery. Consequently, the fuse unit directly attachable to the battery is prevented from being damaged due to hitting the lateral surface of the battery.

Further, with the configuration of (1) described above, the positioning of the fuse unit with respect to the battery is performed by the fuse bracket mounted on the fuse unit and by the bracket connecting member for connecting the fuse bracket to the battery, whereby the fuse unit itself and the battery terminal itself are not particularly required to be modified in structure. Consequently, the battery terminal and the fuse unit directly attachable to the battery are not required to be designed newly, whereby the prevention of the hitting of the fuse unit with respect to the battery can be achieved at low cost.

According to the configuration of (2) described above, the engaging portion on the top surface of the battery, with which the bracket connecting member is engaged, is provided as the mounting holes that are conventionally provided on the top surface of the battery to mount the post cover for covering the upper portion of the battery post. In other words, it is not necessary to form a special-purpose engaging structure on the battery to mount the bracket connecting member, whereby the prevention of the hitting of the fuse unit directly attachable to the battery can be achieved by applying the fuse unit attachment structure according to the present invention without any remodeling of the battery.

According to the configuration of (3) described above, both the unit supporting portion and the connecting member engaging portion provided for the fuse bracket have simple structures each having a pair of guide grooves, whereby the structure of the fuse bracket can be made simple.

With the fuse unit attachment structure according to illustrative aspects of the present invention, it is possible to prevent the fuse unit directly attachable to a battery to be connected to the battery post of the battery via the battery terminal from hitting the lateral surface of the battery without modifying a structure of an existing terminal or fuse unit.

The present invention has been briefly described above. Details of the present invention will be further clarified by reading through a mode for carrying out the invention (hereafter referred to as "embodiment") described below with reference to the accompanying drawings.

EMBODIMENTS OF INVENTION

Figure 1:
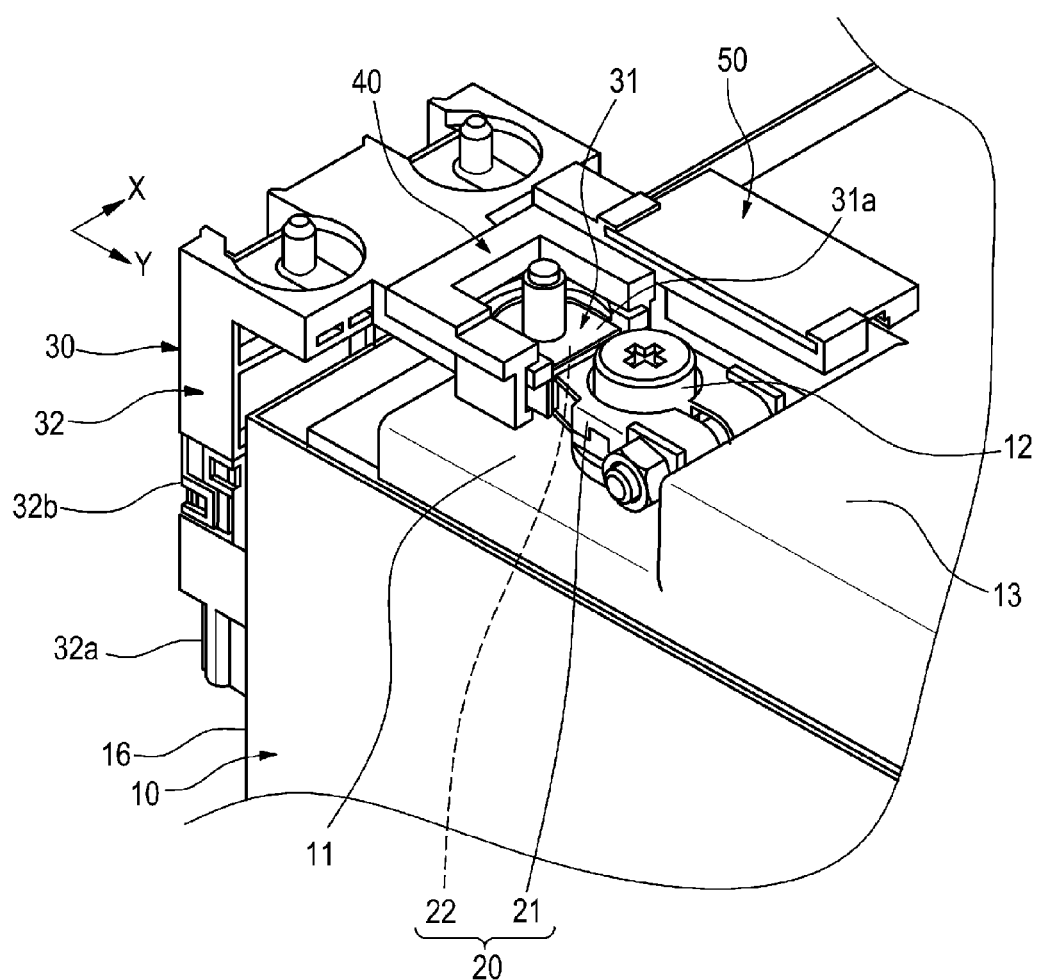
FIG. 1 is a perspective view illustrating a fuse unit attachment structure according to an embodiment of the present invention.

Hereinafter, embodiments of a fuse unit attachment structure according to the present invention will be described in detail with reference to the drawings.

As shown in FIGS. 1 to 14, the fuse unit attachment structure according to an embodiment of the present invention is used to restrict the position of a fuse unit 30 directly attachable to a battery 10 at the time when the fuse unit 30 is connected to the battery post 12 of the battery 10 via a battery terminal 20. In the fuse unit attachment structure according to the embodiment, the mounting position of the fuse unit 30 is restricted by two components, i.e., a fuse bracket 40 and a bracket connecting member 50.

The battery post 12 is a columnar electrode provided on the battery 10 and is arranged at a post arranging section 11 at a corner of an upper surface of the battery 10. The post arranging section 11 is provided at a position one-step lower than the top surface 13 of the battery to suppress the battery terminal 20 fastened to the battery post 12 from protruding toward the top surface 13 of the battery.

On the top surface 13 of the battery around the post arranging section 11, a pair of mounting holes 15 is provided as an engaging portion to be engaged with the battery connection portion 52 of the bracket connecting member 50. This pair of mounting holes 15 serves as cover mounting holes conventionally formed on the top surface 13 of the battery to mount a post cover (not shown) for covering the upper portion of the battery connection portion 52. In other words, in the embodiment, the existing mounting holes 15 for mounting the post cover are used so as to be engaged with the bracket connecting member 50.

Figure 2:
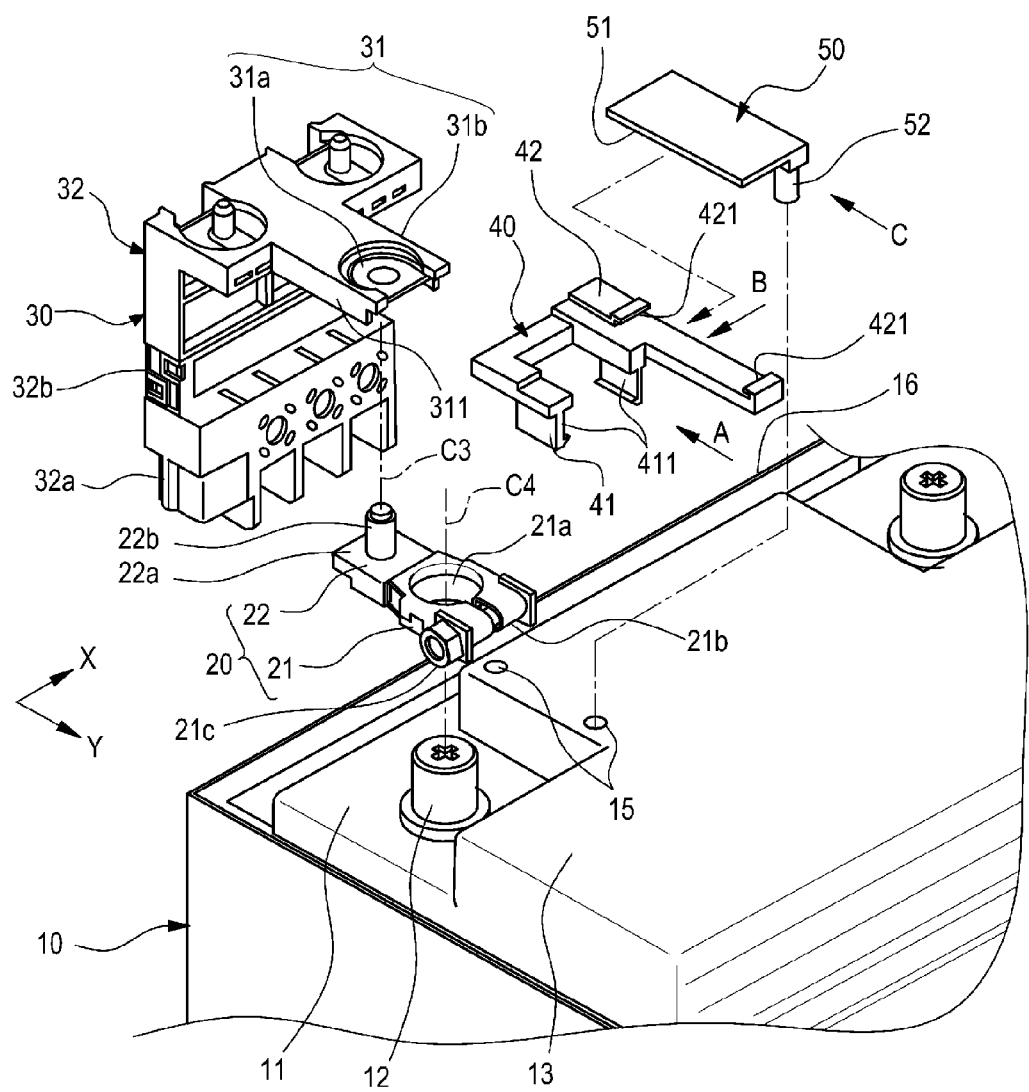
FIG. 2 is an exploded perspective view illustrating the fuse unit attachment structure shown in FIG. 1.

The battery terminal 20 includes, as shown in FIGS. 1 and 2, a post fastening section 21 which is fastened to the battery post 12 and a fuse unit mounting section 22 to which the fuse unit 30 directly attachable to the battery is screw-fastened.

The post fastening section 21 has a structure including a post insertion hole 21a into which the battery post 12 is inserted, a slit 21b in which the post insertion hole 21a is partially cut, and a fastening screw 21 for fastening the post fastening section 21 to the battery post 12 by tightening the slit 21b so that the clearance in the slit 21b becomes narrow.

The fuse unit mounting section 22 is configured such that a stud bolt 22b is provided upright on a conductive plate portion 22a integrated with the post fastening section 21 as shown in FIG. 2. The stud bolt 22b is provided such that the extending direction of the center axis line C3 thereof is parallel to the direction of the center axis line C4 of the post insertion hole 21a of the post fastening section 21.

Figure 12:
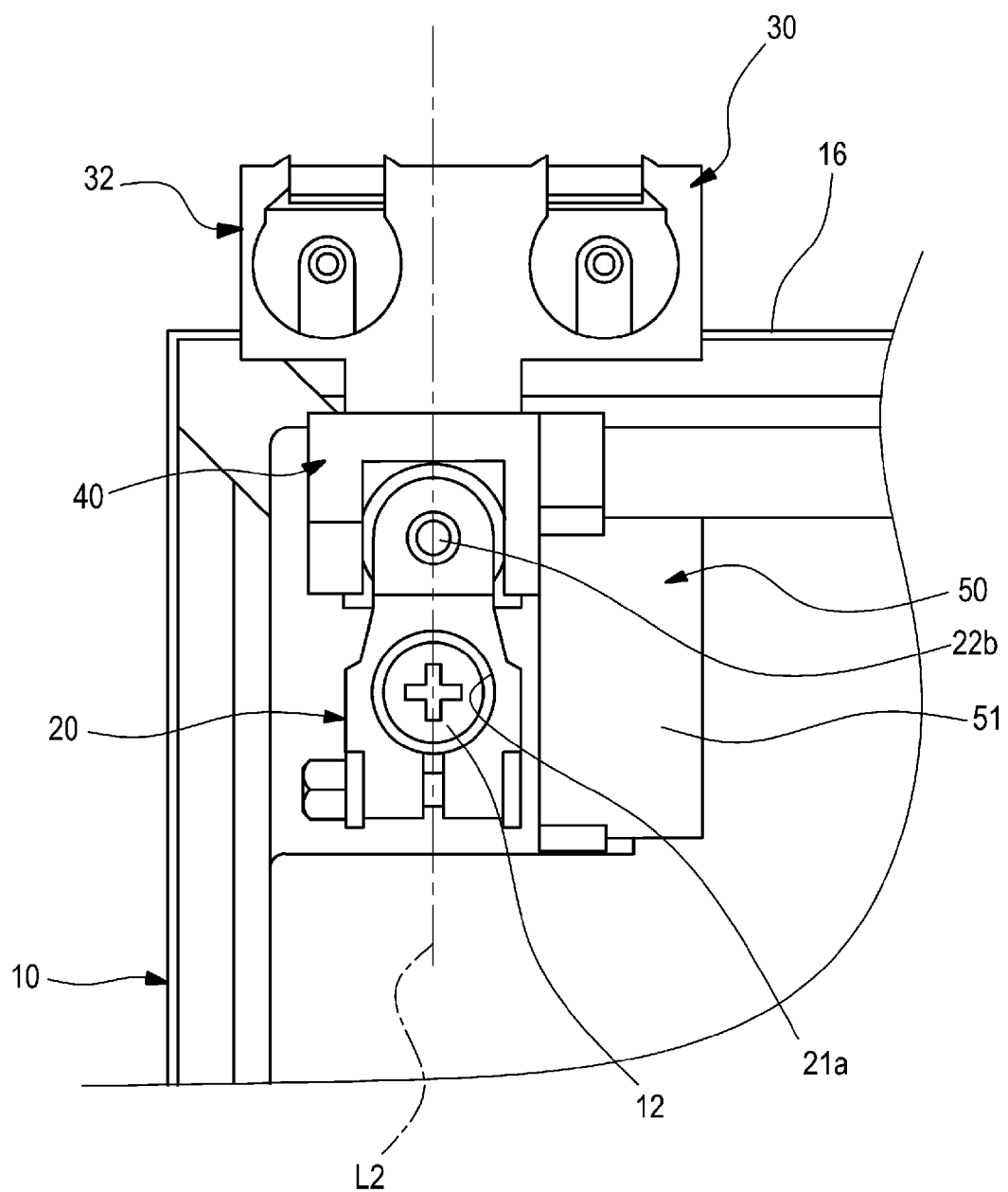
FIG. 12 is a plan view illustrating the fuse unit attachment structure according to the embodiment of the present invention in a case in which the mounting direction of the battery terminal is proper.

FIG. 12 illustrates a state in which the battery terminal 20 is mounted on the battery post 12 of the battery 10 in its proper mounting direction. The proper mounting direction of the battery terminal 20 is a direction in which the straight line L2 connecting the center of the post insertion hole 21a to the center of the stud bolt 22b is perpendicular to the lateral surface 16 of the battery 10 as shown in FIG. 12.

The fuse unit 30 directly attachable to a battery includes, as shown in FIGS. 1 and 2, a terminal connection section 31 and a resin housing 32.

The terminal connection section 31 has a terminal connection conductor 31a fastened to the fuse unit mounting section 22 and a housing section 31b made of an insulating resin and accommodating the terminal connection conductor 31a.

The housing section 31b is integrated with the resin housing 32. The housing section 31b covers the circumference of the terminal connection conductor 31a so as not to prevent the conductive connection between the terminal connection conductor 31a and the fuse unit mounting section 22. Since the terminal connection conductor 31a is fastened to the fuse unit mounting section 22, the terminal connection section 31 becomes conductive with the battery terminal 20, thereby being electrically connected to the battery post 12 via the battery terminal 20.

Figure 3:
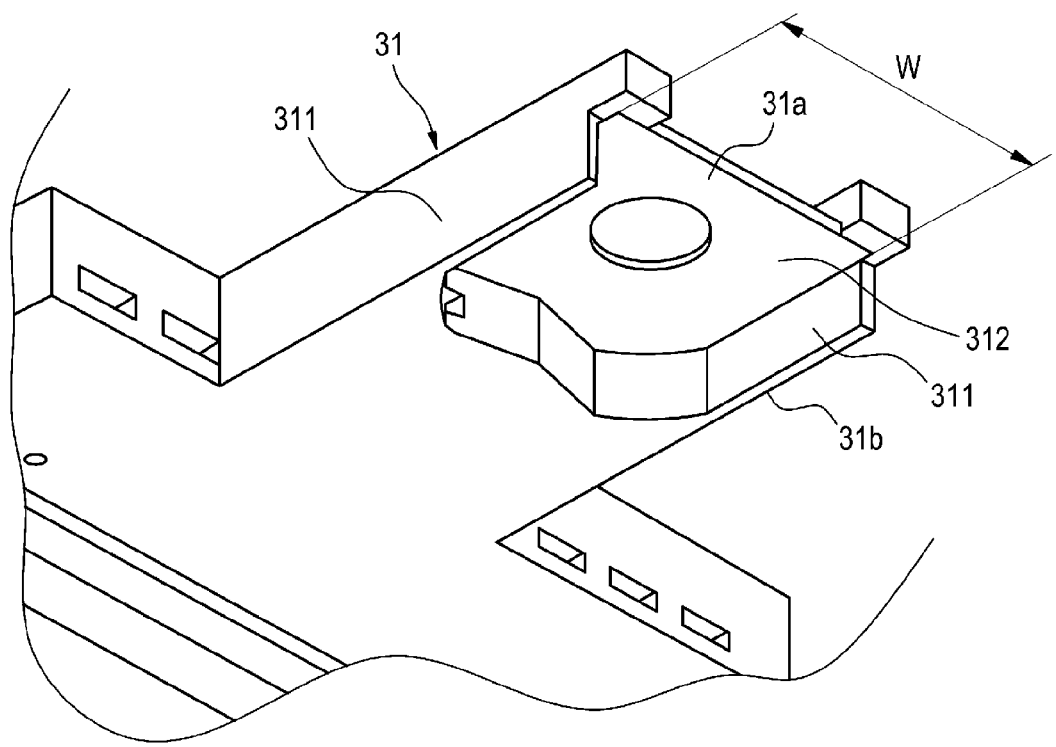
FIG. 3 is an enlarged perspective view illustrating a structure on a back side of a terminal connection section of the fuse unit directly attachable to a battery shown in FIG. 2.
Figure 11:
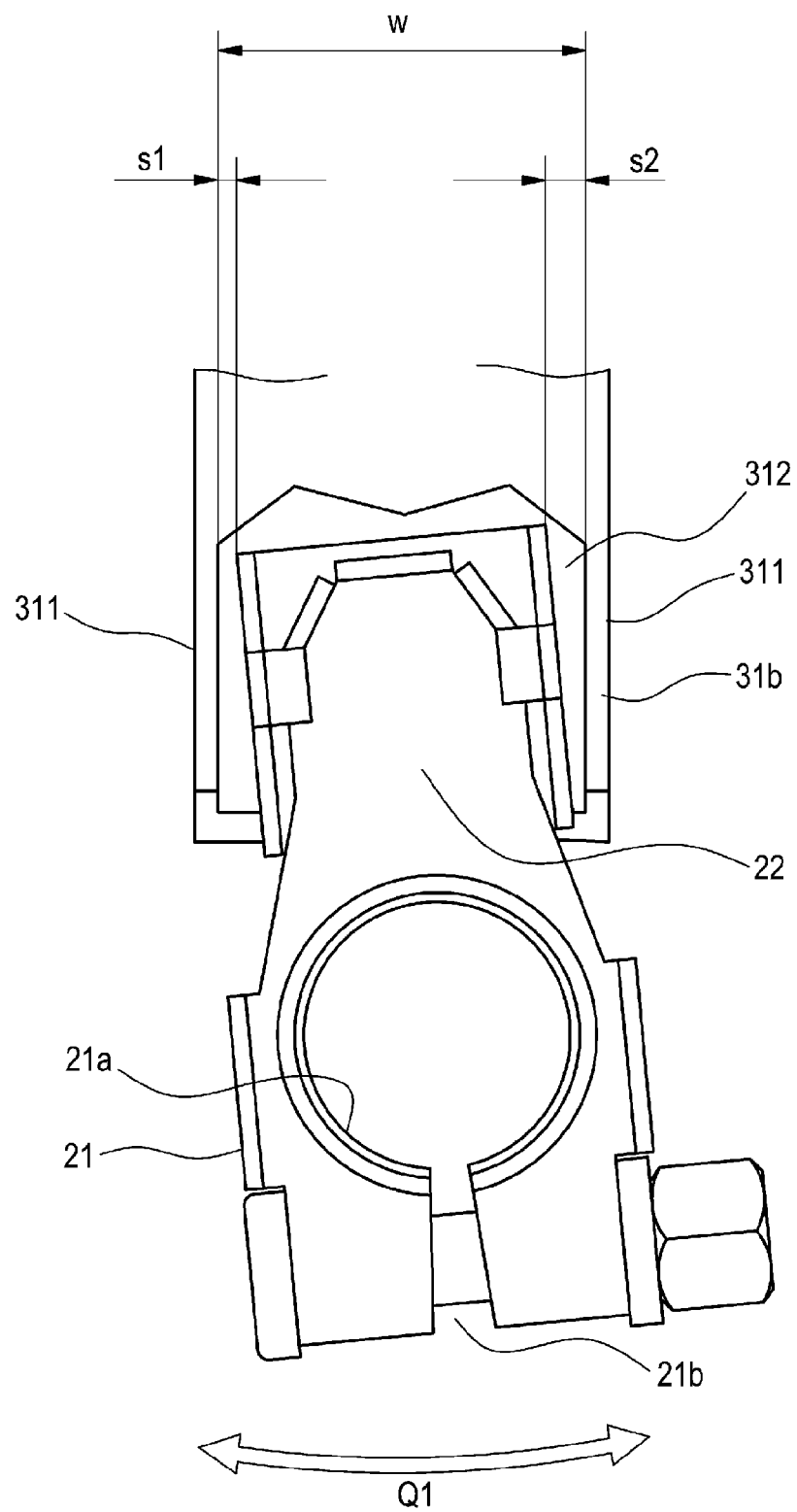
FIG. 11 is an explanatory view illustrating a state in which the terminal connection section of the fuse unit directly attachable to the battery and the battery terminal shown in FIG. 2 are connected to each other.

According to the present embodiment, in the housing section 31b, a vacant space section 312 is defined on the back side of the terminal connection conductor 31a by a pair of side wall portions 311 extending downward at both sides of the terminal connection conductor 31a as shown in FIG. 3. This vacant space section 312 is a vacant space into which the fuse unit mounting section 22 advances as shown in FIG. 11. The width dimension W (see FIG. 3) of the vacant space section 312 is set so as to be larger than the width dimension of the fuse unit mounting section 22 so that spaces s1 and s2 are left on both sides of the fuse unit mounting section 22 that is placed on the back face of the terminal connection conductor 31a as shown in FIG. 11. These spaces s1 and s2 secured on both sides of the fuse unit mounting section 22 in the vacant space section 312 allow relative rotation with the fuse unit mounting section 22.

A plurality of connection terminals and fuses that are connected to the terminal connection conductor 31a in a branched manner are accommodated in the resin housing 32.

The plurality of connection terminals connected to the terminal connection conductor 31a in a branched manner are accommodated in the terminal accommodating section 32a of the resin housing 32. Electric wires receiving electric power from the battery 10 are connected to the connection terminals accommodated in the terminal accommodating section 32a. The plurality of fuses provided between the terminal connection conductor 31a and the connection terminals are accommodated in a fuse accommodating section 32b.

The resin housing 32 accommodating the plurality of fuses and connection terminals is formed in a shape that extends downward perpendicularly from the end section of the terminal connection conductor 31a. As shown in FIG. 12, when the fuse unit 30 directly attachable to the battery is properly mounted on the battery terminal 20 that is mounted on the battery post 12 in the proper mounting direction, the resin housing 32, that is, part of the fuse unit 30, is disposed along the lateral surface 16 of the battery 10, whereby the protruding amount thereof from the battery 10 is reduced.

The fuse bracket 40 is mounted on the fuse unit 30 directly attachable to the battery. The fuse bracket 40 has a unit supporting portion 41 and a connecting member engaging portion 42 as shown in FIGS. 4 and 5.

Figure 4:
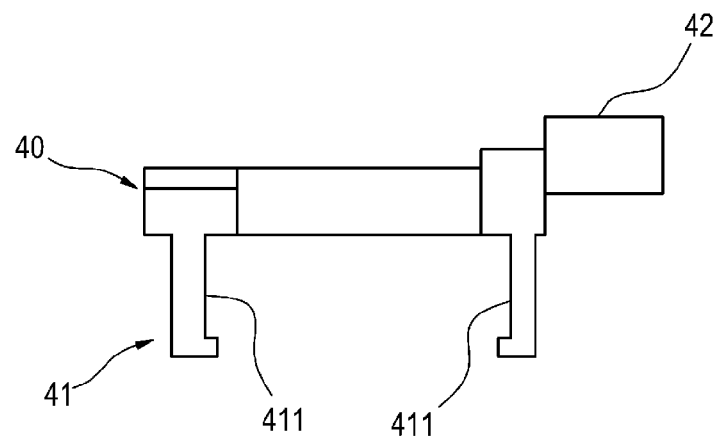
FIG. 4 is a view illustrating a fuse bracket shown in FIG. 2, viewed from the direction A.
Figure 8:
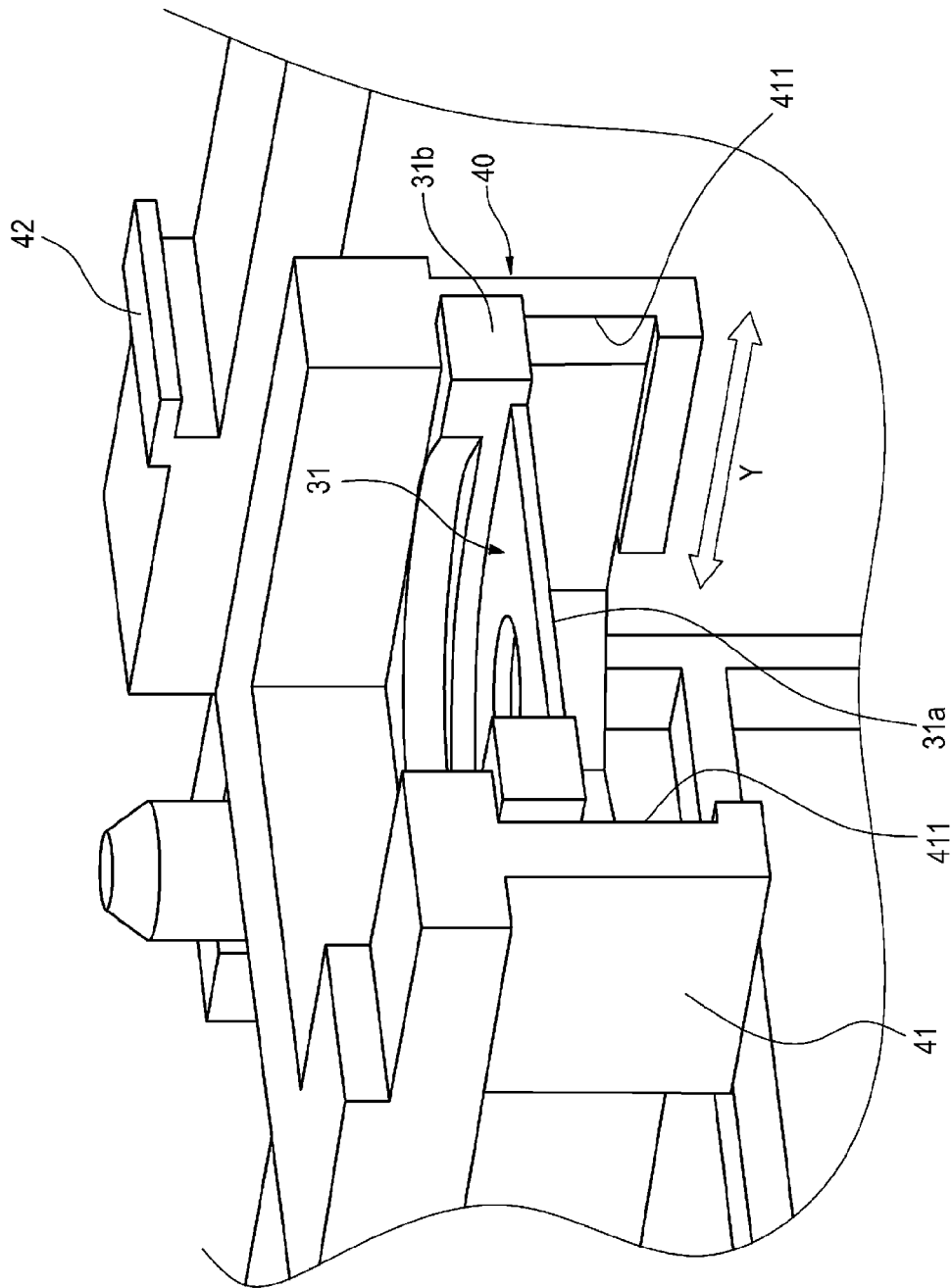
FIG. 8 is an enlarged perspective view illustrating a state in which the terminal connection section of the fuse unit directly attachable to a battery and the unit supporting portion of the fuse bracket shown in FIG. 2 are engaged with each other.

The unit supporting portion 41 has a pair of first guide grooves 411 with which both sides of the terminal connection section 31 of the fuse unit 30 are slidably engaged as shown in FIGS. 4 and 8. The first guide grooves 411 are grooves with which both sides of the terminal connection section 31 are slidably engaged in a direction perpendicular to the lateral surface 16 of the battery 10 (in the direction indicated by arrow Y in FIGS. 2 and 8).

In other words, the unit supporting portion 41 allows the pair of first guide grooves 411 to be engaged with both sides of the terminal connection section 31, thereby supporting the fuse unit 30 so that the fuse unit 30 is movable in the direction perpendicular to the lateral surface 16 of the battery 10.

Figure 5:
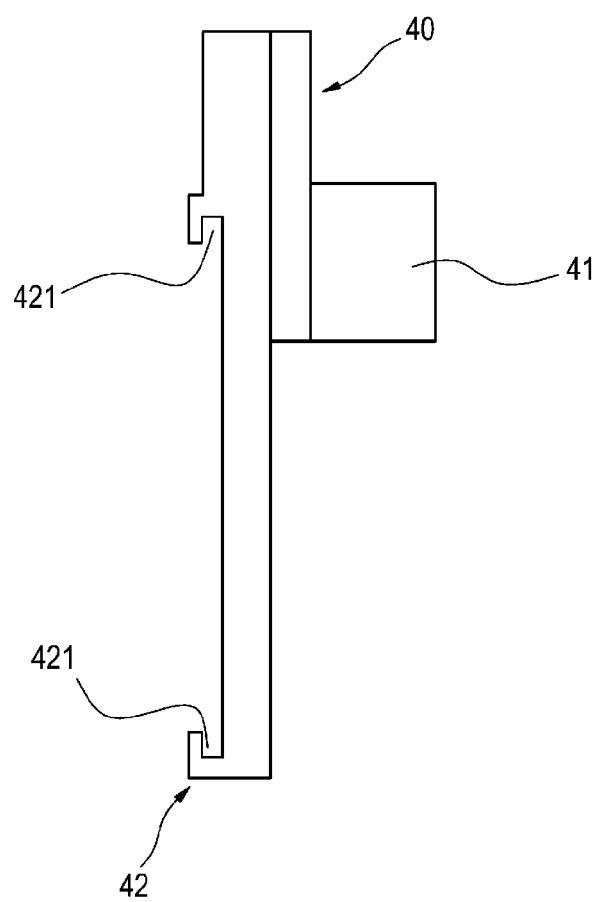
FIG. 5 is a view illustrating the fuse bracket shown in FIG. 2, viewed from the direction B.
Figure 9:
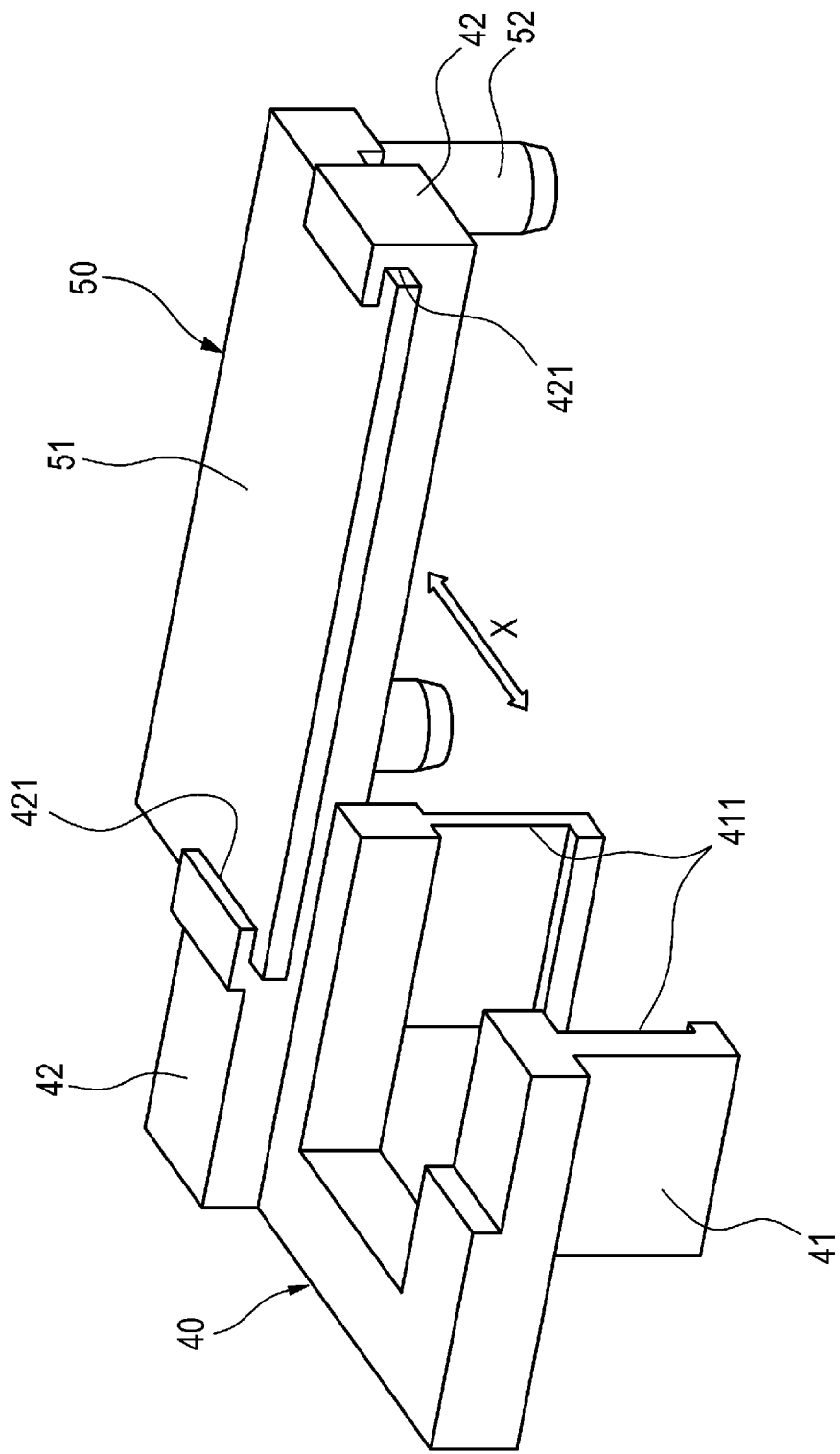
FIG. 9 is a perspective view illustrating a state in which the fuse bracket and the bracket connecting member shown in FIG. 2 are engaged with each other.

The connecting member engaging portion 42 has a pair of second guide grooves 421 with which the guide plate portion 51 protruding from the bracket connecting member 50 is slidably engaged as shown in FIGS. 5 and 9. The pair of second guide grooves 421 serves as grooves with which the guide plate portion 51 of the bracket connecting member 50 is engaged so that the guide plate portion can move in a direction along the lateral surface 16 of the battery 10 (in the direction indicated by arrow X in FIGS. 2 and 9).

In other words, since the guide plate portion 51 of the bracket connecting member 50 is engaged with the pair of the second guide grooves 421, the connecting member engaging portion 42 is engaged with the bracket connecting member 50 so as to be slidable in the direction along the lateral surface 16 of the battery 10.

Figure 6:
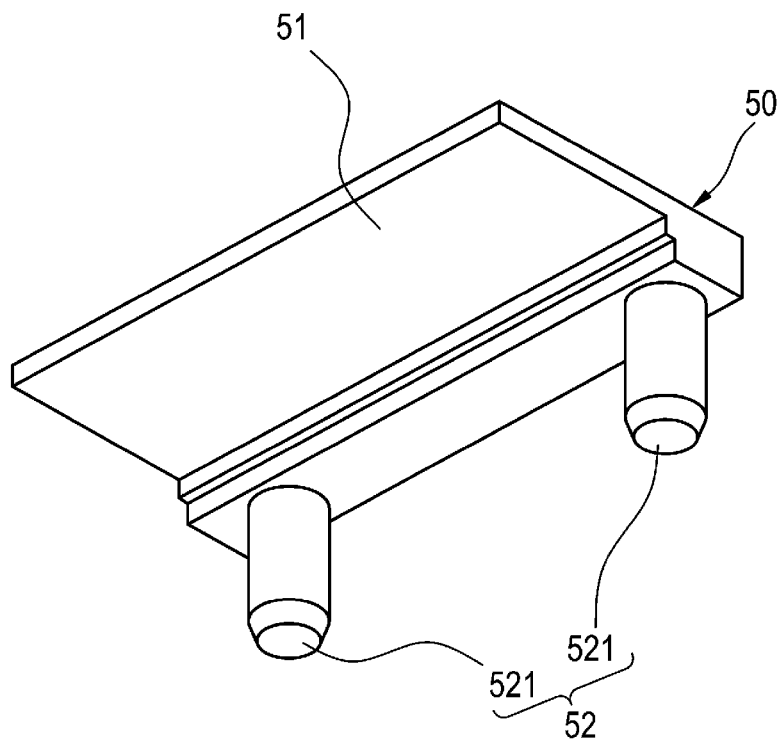
FIG. 6 is a perspective view illustrating a bracket connecting member shown in FIGS. 1 and 2, viewed from a lower side thereof.
Figure 7:
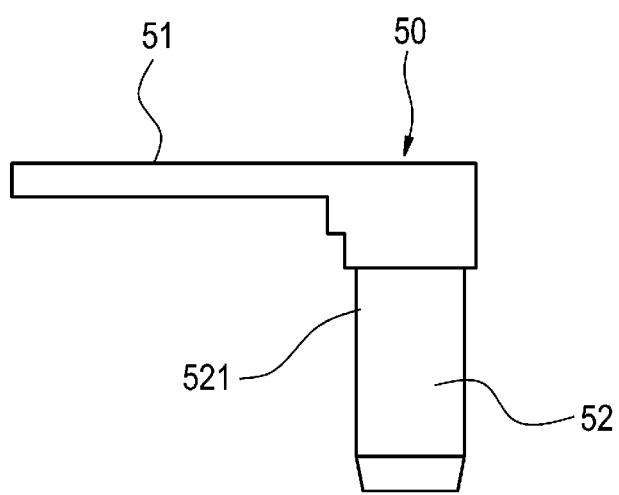
FIG. 7 is a view illustrating the bracket connecting member shown in FIG. 2, viewed from the direction C.

The bracket connecting member 50 is a member for connecting the fuse bracket 40 to the battery 10 and has the guide plate portion 51 and the battery connection portion 52 as shown in FIGS. 6 and 7.

The guide plate portion 51 is formed into a rectangular protruding shape extending along the direction indicated by arrow X in FIG. 2. Both side edges of the guide plate portion 51 are engaged with the second guide grooves 421 of the connecting member engaging portion 42, whereby the guide plate portion 51 supports the fuse bracket 40 so that the fuse bracket is movable in the direction along the lateral surface 16 of the battery 10 (in the direction indicated by arrow X in FIG. 9) as shown in FIG. 9.

Figure 10:
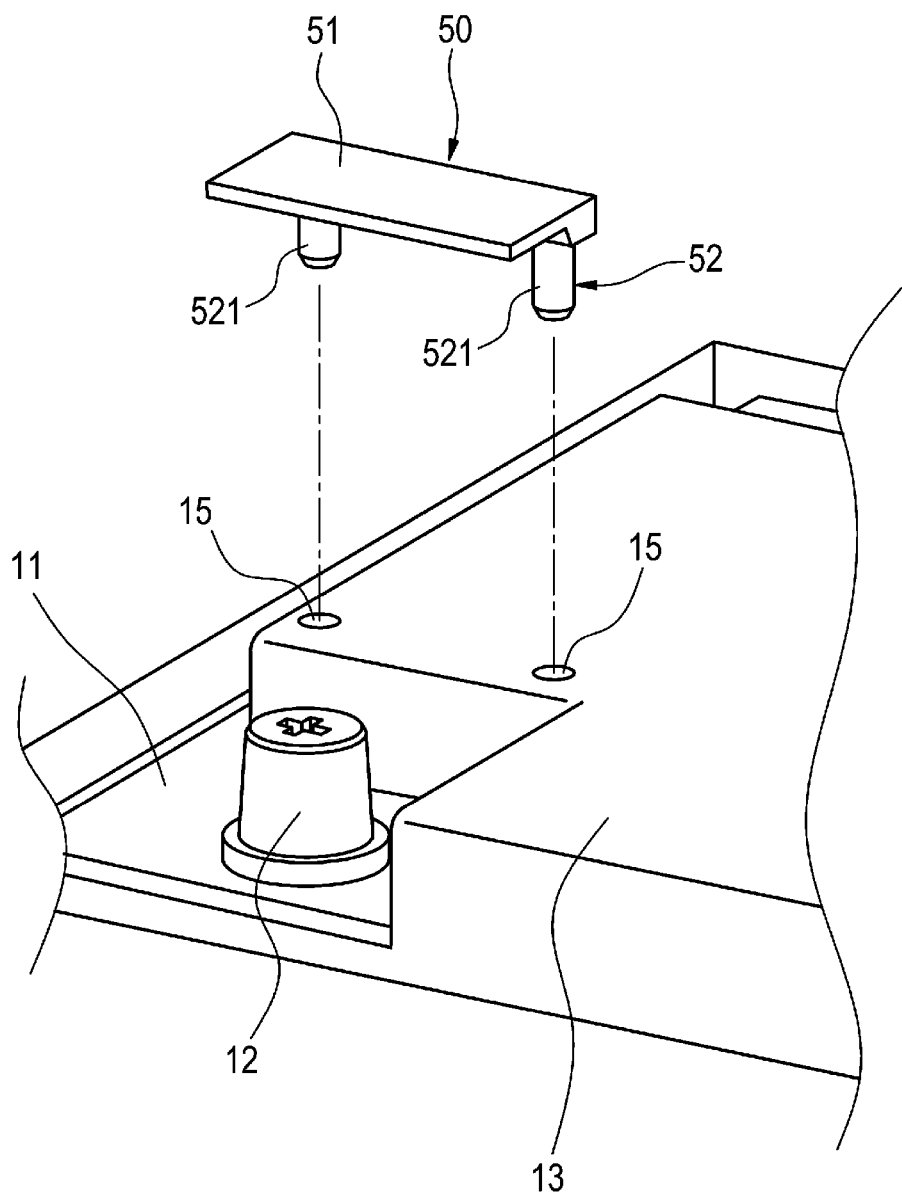
FIG. 10 is a perspective view illustrating a structure for mounting the bracket connecting member shown in FIG. 2 on the battery.

The battery connection portion 52 includes, as shown in FIG. 10, a pair of protrusions 521 to be engaged with (fitted into) the pair of mounting holes 15 serving as the engaging portion on the top surface 13 of the battery from the upper side of the battery 10. However, the battery connection portion of the bracket connecting member and the engaging portion according to the present invention are not limited to the protrusions 521 and the mounting holes 15 according to the embodiment, but can take various modes, such as a concave-convex fitting mode, as a matter of course, provided that the battery connection portion of the bracket connecting member can be engaged with the engaging portion.

The pair of protrusions 521 forming the battery connection portion 52 is fitted into the pair of mounting holes 15 on the top surface 13 of the battery, whereby the movement of the bracket connecting member 50 in the direction along the top surface 13 of the battery is restricted.

The fuse bracket 40 and the bracket connecting member 50 described above are assembled with the fuse unit 30 directly attachable to a battery before the fuse unit 30 is mounted on the battery terminal 20. Furthermore, when the fuse unit 30 assembled with the fuse bracket 40 and the bracket connecting member 50 is mounted on the fuse unit mounting section 22 of the battery terminal 20 from the upper side of the battery 10, the pair of protrusions 521 of the bracket connecting member 50 is engaged with the mounting holes 15 on the top surface 13 of the battery, whereby the fuse unit 30 is positioned at a predetermined position with respect to the battery 10.

Figure 13:
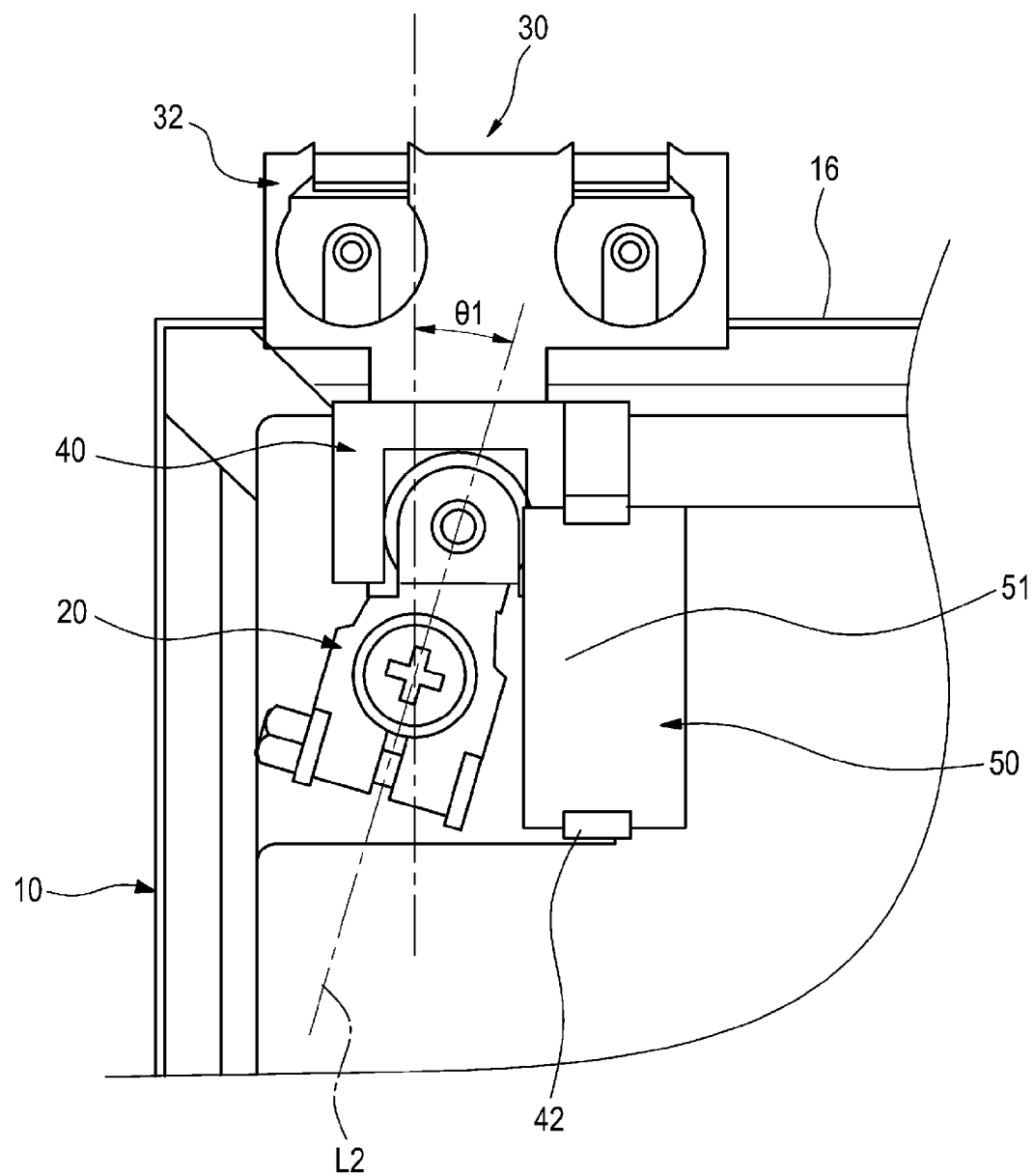
FIG. 13 is a plan view illustrating the fuse unit attachment structure according to the embodiment of the present invention in a state in which the mounting direction of the battery terminal is inclined by a predetermined angle from the proper direction.
Figure 14:
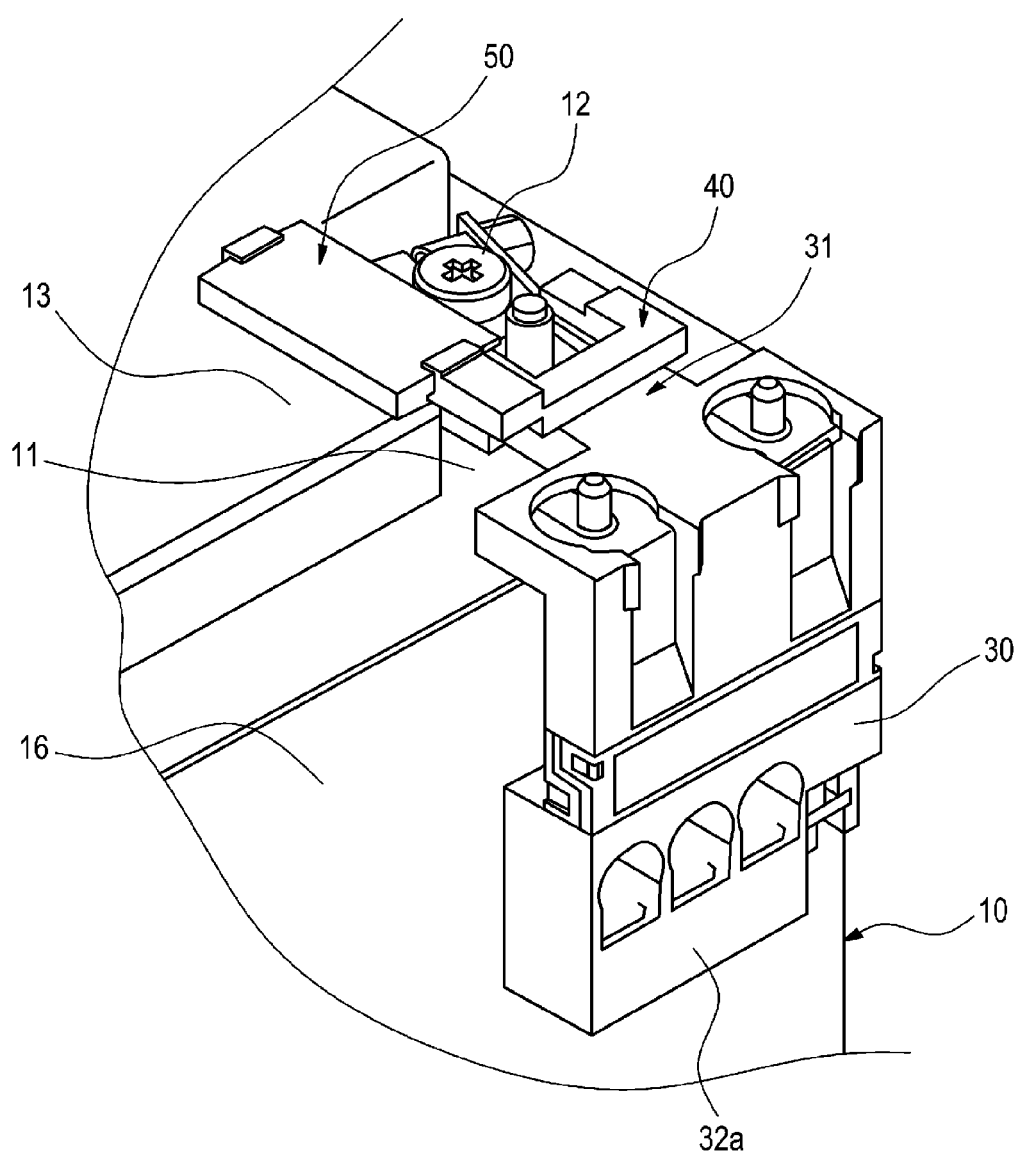
FIG. 14 is a perspective view illustrating the mounting state shown in FIG. 13.
Figure 15:
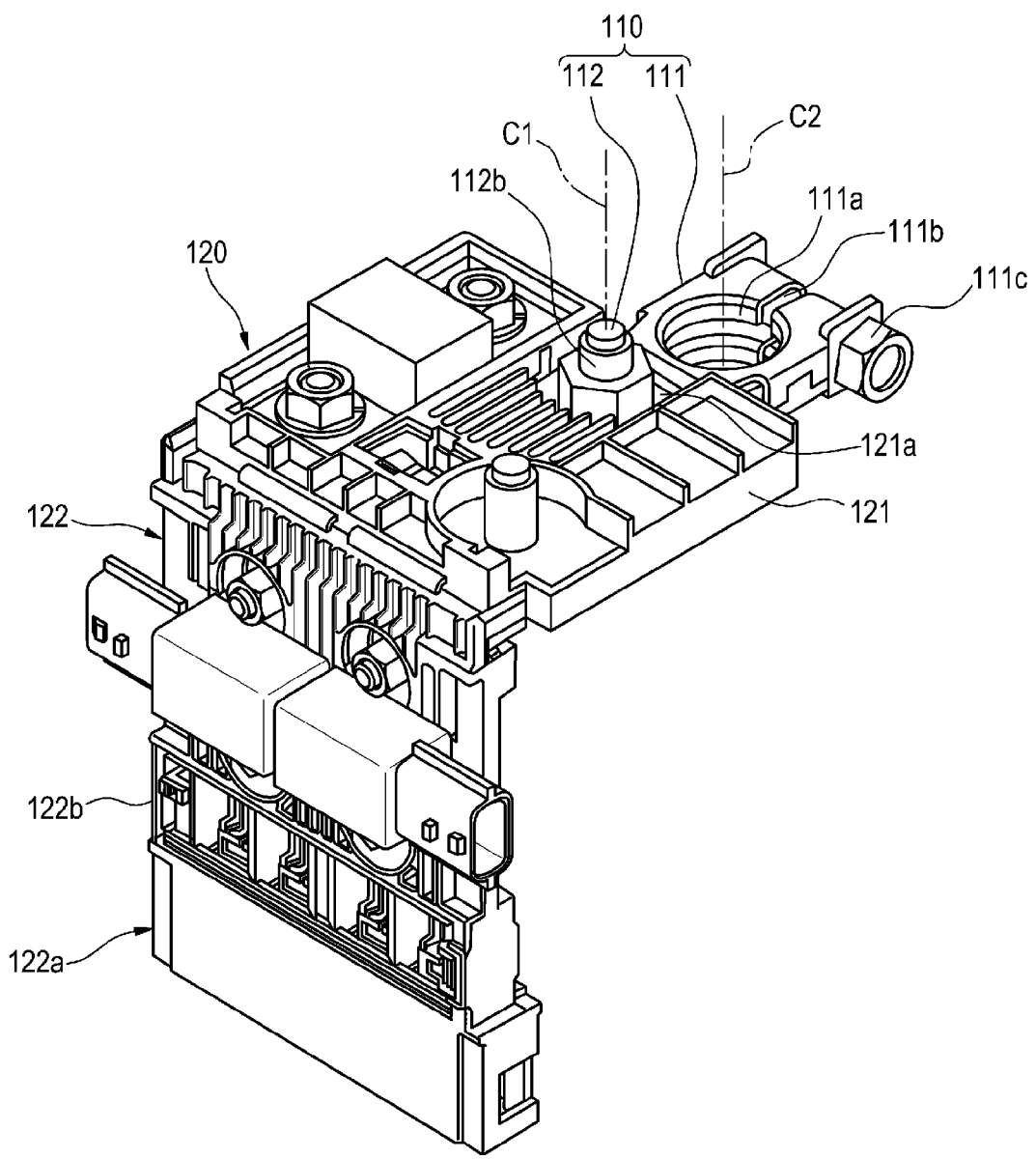
FIG. 15 is a perspective view illustrating a conventional fuse unit attachment structure.
Figure 16:
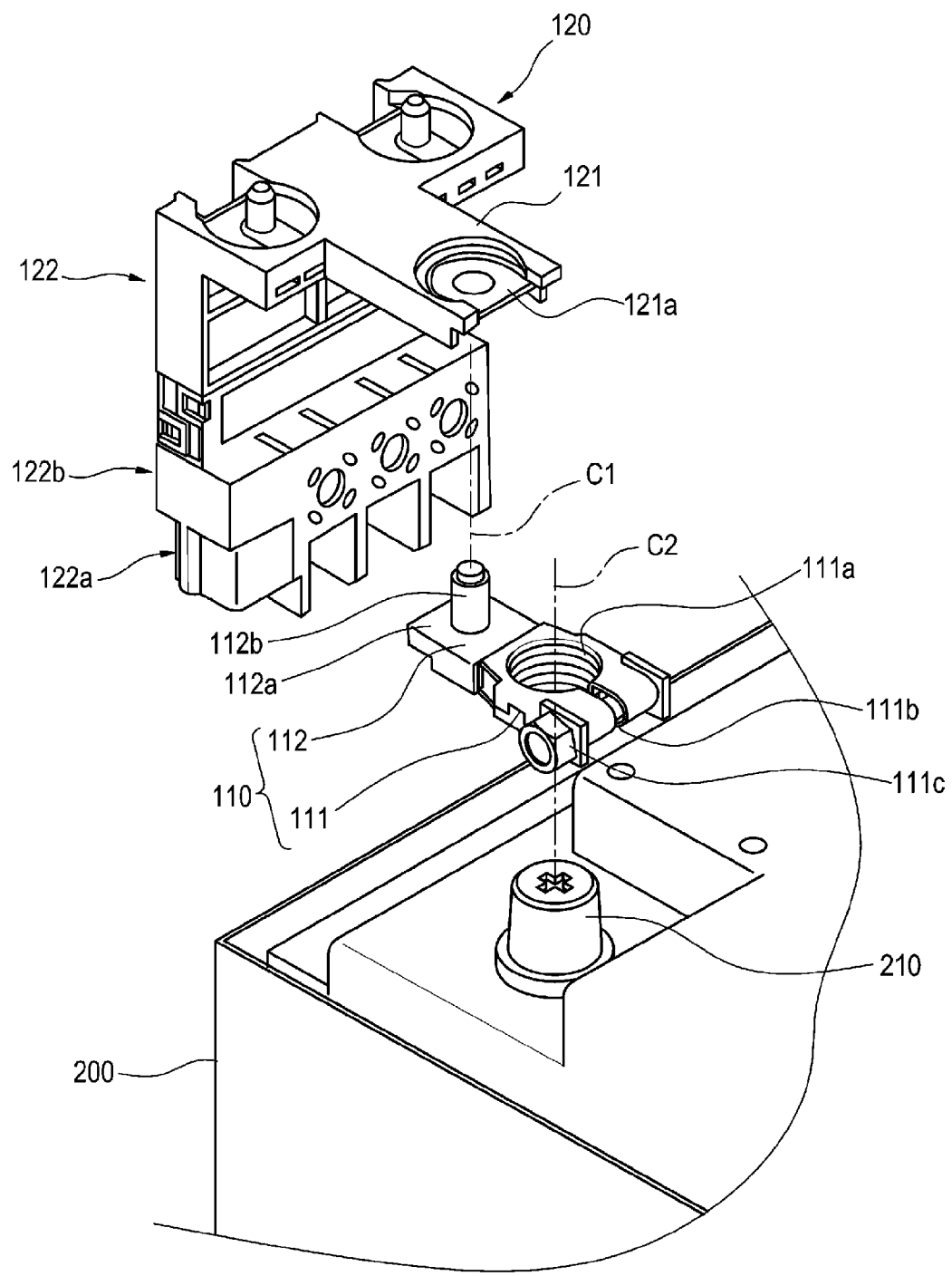
FIG. 16 is an exploded perspective view illustrating a battery terminal and a fuse unit directly attachable to a battery to be connected to a battery post in an attachment structure similar to the one shown in FIG. 15.
Figure 17:
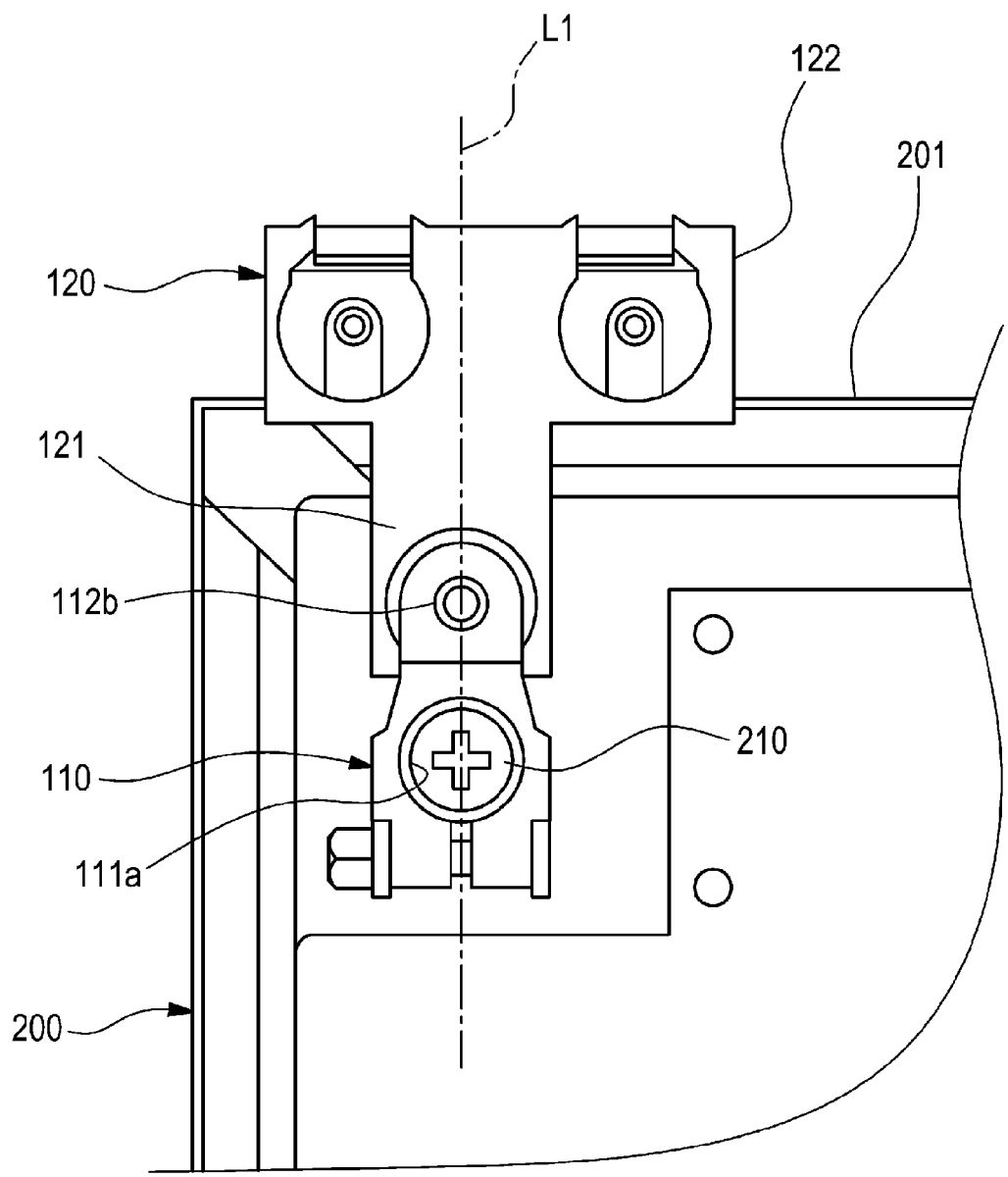
FIG. 17 is a plan view illustrating a state in which the battery terminal is mounted on the battery in a proper mounting direction in the fuse unit attachment structure shown in FIG. 16.
Figure 18:
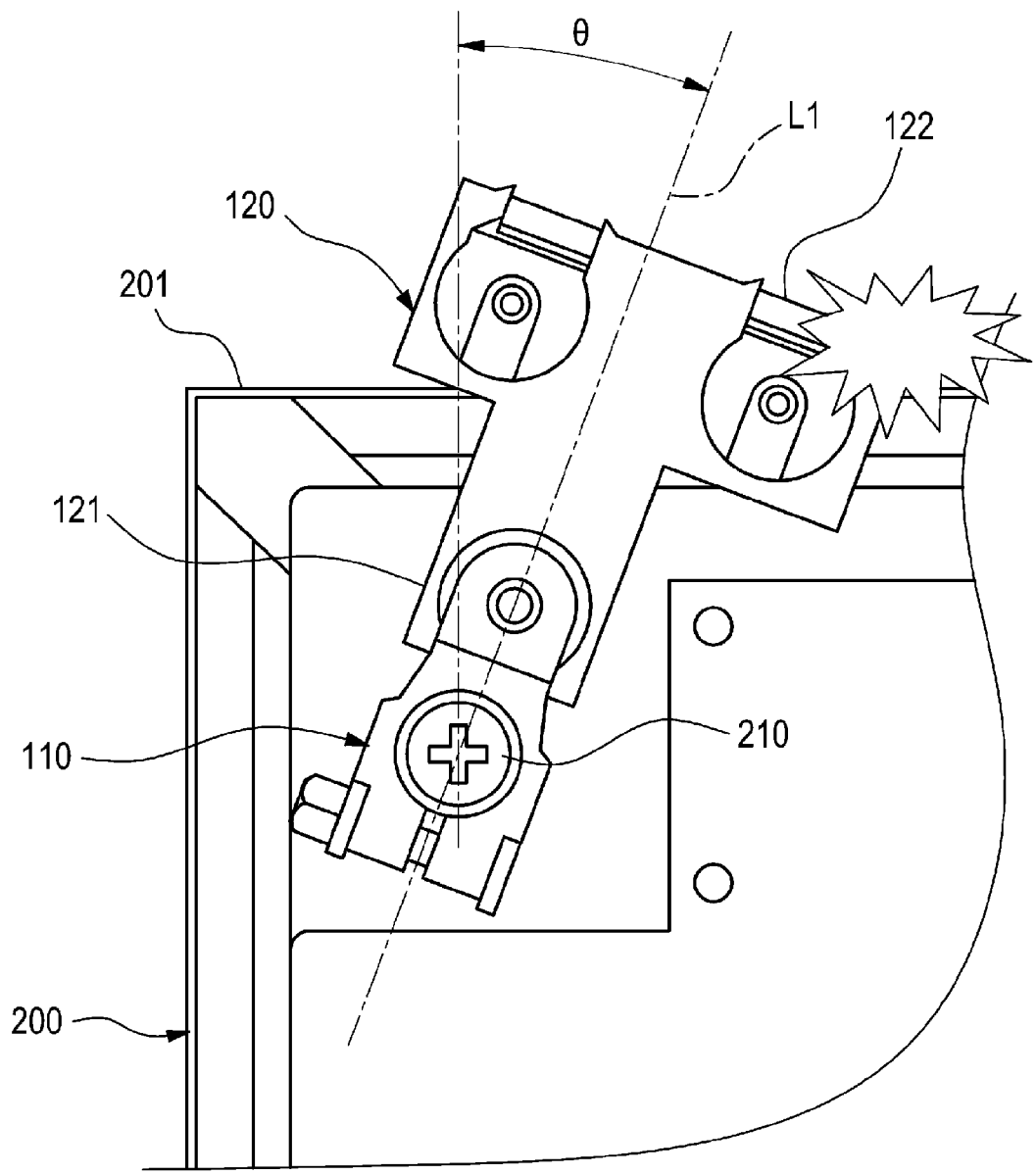
FIG. 18 is a plan view illustrating a state in which the mounting direction of the battery terminal is inclined from the proper mounting direction in the fuse unit attachment structure shown in FIG. 16.

In the fuse unit attachment structure according to the embodiment described above, the battery directly attaching type fuse unit 30 connected to the battery terminal 20 is positioned on the battery 10 by the fuse bracket 40 mounted on the fuse unit 30 directly attachable to the battery and by the bracket connecting member 50 for connecting the fuse bracket 40 to the battery 10. Moreover, in the fuse unit attachment structure according to the embodiment, when the mounting direction of the battery terminal 20 is inclined by angle θ1 from the proper mounting direction as shown in FIGS. 13 and 14, the movement direction of the fuse unit 30 connected to the battery terminal 20 is restricted by the engagement between the unit supporting portion 41 of the fuse bracket 40 and the terminal connection section 31 and by the engagement between the guide plate portion 51 of the bracket connecting member 50 and the second guide grooves 421 of the fuse bracket 40.

Hence, the moving operation of the fuse unit 30 directly attachable to the battery accompanied by the inclination of the battery terminal 20 becomes parallel movement operation with respect to the lateral surface 16 of the battery 10 while the fuse unit 30 maintains the same mounting posture as that obtained when the mounting direction of the battery terminal 20 is proper, whereby the fuse unit 30 is prevented from hitting the lateral surface 16 of the battery 10. Consequently, the fuse unit 30 is prevented from being damaged due to hitting the lateral surface 16 of the battery 10.

Further, with the fuse unit attachment structure according to the embodiment, the positioning of the fuse unit 30 directly attachable to the battery 10 is performed by the fuse bracket 40 mounted on the fuse unit 30 and by the bracket connecting member 50 for connecting the fuse bracket 40 to the battery 10, whereby the fuse unit 30 itself and the battery terminal 20 itself are not particularly required to be modified in structure. Consequently, the battery terminal 20 and the fuse unit 30 are not required to be designed newly, whereby the prevention of the hitting of the fuse unit 30 with respect to the battery 10 can be achieved at low cost.

Further, with the fuse unit attachment structure according to the embodiment, the engaging portion on the top surface 13 of the battery, with which the bracket connecting member 50 is engaged, is provided as the mounting holes 15 that are conventionally provided on the top surface 13 of the battery to mount the post cover for covering the upper portion of the battery post 12. In other words, it is not necessary to form a special-purpose engaging structure on the battery 10 to mount the bracket connecting member 50, whereby the prevention of the hitting of the fuse unit 30 can be achieved by applying the fuse unit attachment structure according to the present invention without any remodeling of the battery 10.

Further, with the fuse unit attachment structure according to the embodiment, both the unit supporting portion 41 and the connecting member engaging portion 42 provided for the fuse bracket 40 have simple structures each having a pair of guide grooves, whereby the structure of the fuse bracket 40 can be made simple.

Further, the unit supporting portion 41 provided for the fuse bracket 40 has the pair of first guide grooves 411 for slidably holding both sides of the terminal connection section 31 of the fuse unit 30 directly attachable to the battery. Hence, the fuse unit 30 can be supported so as to be movable in the direction perpendicular to the lateral surface 16 of the battery 10 without performing special processing to the terminal connection section 31 itself of the fuse unit 30. Consequently, prevention of hitting can also be achieved for the fuse unit 30.

The present invention is not limited to the embodiments described above, and changes and modifications may be made therein as appropriate. The materials, shapes, dimensions, quantities, arrangement positions, and the like of the respective components in the embodiments described above are optional and not limited in so far as the present invention can be achieved.

Here, features of the embodiments of the fuse unit attachment structure according to the present invention described above will be briefly summarized and listed in the following [1] to [3].

[1] A fuse unit attachment structure including a fuse bracket (40) configured to be mounted on a fuse unit (30) directly attachable to the battery, the fuse unit (30) configured to be connected to a battery terminal (20) to be fastened to a battery post (12) of a battery (10) such that a portion of the fuse unit (30) is disposed on a side of a lateral surface (16) of the battery (10), and a bracket connecting member (50) configured to connect the fuse bracket (40) to the battery (10), wherein the fuse bracket (40) includes a unit supporting portion (41) configured to support the fuse unit (30) directly attachable to the battery such that the fuse unit (30) is movable in a direction perpendicular to the lateral surface (16) of the battery (10) and a connecting member engaging portion (42) configured to engage with the bracket connecting member (50) so as to be movable in a direction along the lateral surface (16) of the battery (10), and wherein the bracket connecting member (50) includes a guide plate portion (51) configured to engage with the connecting member engaging portion (42) to support the fuse bracket (40) such that the fuse bracket (40) is movable in the direction along the lateral surface (16) of the battery (10) and a battery connection portion (52) configured to engage with an engaging portion (mounting holes 15) provided on a top surface (13) of the battery around a post arranging section (11) of the battery (10) on which the battery post (12) is arranged such that a movement of the battery connection portion (52) in a direction along the top surface (13) of the battery is restricted.

[2] The fuse unit attachment structure according to [1] described above, wherein the engaging portion on the top surface (13) of the battery is an existing mounting hole (15) provided on the top surface (13) of the battery to mount a post cover that covers an upper portion of the battery post (12).

[3] The fuse unit attachment structure according to [1] or [2] described above, wherein the unit supporting portion (41) includes a pair of first guide grooves (411) with which respective sides of a terminal connection section (31) of the fuse unit (30) directly attachable to the battery to be connected to the battery terminal (20) are engaged such that the respective sides of a terminal connection section (31) are slidable in the direction perpendicular to the lateral surface (16) of the battery (10), and wherein the connecting member engaging portion (42) includes a pair of second guide grooves (421) with which the guide plate portion (51) of the bracket connecting member (50) provided in a protruding manner is engaged such that the guide plate portion (51) is slidable in the direction along the lateral surface (16) of the battery (10).

What is claimed is:

1. A fuse unit attachment structure comprising:
   a fuse bracket configured to be mounted on a fuse unit directly attachable to a battery, the fuse unit configured to be connected to a battery terminal to be fastened to a battery post of the battery such that a portion of the fuse unit is disposed on a side of a lateral surface of the battery, and
   a bracket connecting member configured to connect the fuse bracket to the battery,
   wherein the fuse bracket comprises
      a unit supporting portion supporting the fuse unit such that the fuse unit is movable in a direction perpendicular to the lateral surface of the battery when the fuse unit is attached to the battery; and
      a connecting member engaging portion engaging with the bracket connecting member so as to be movable in a direction along the lateral surface of the battery when the fuse unit is attached to the battery, and
   wherein the bracket connecting member comprises
      a guide plate portion engaging with the connecting member engaging portion to support the fuse bracket such that the fuse bracket is movable in the direction along the lateral surface of the battery when the fuse unit is attached to the battery; and
      a battery connection portion configured to engage with an engaging portion provided on a top surface of the battery around a post arranging section of the battery on which the battery post is arranged such that a movement of the battery connection portion in a direction along the top surface of the battery is restricted.

2. The fuse unit attachment structure according to claim 1, wherein the engaging portion on the top surface of the battery is an existing mounting hole provided on the top surface of the battery to mount a post cover that covers an upper portion of the battery post.

3. The fuse unit attachment structure according to claim 1, wherein the unit supporting portion comprises a pair of first guide grooves with which respective sides of a terminal connection section of the fuse unit to be connected to the battery terminal are engaged such that the respective sides of the terminal connection section are slidable in the direction perpendicular to the lateral surface of the battery, and
   wherein the connecting member engaging portion comprises a pair of second guide grooves with which the guide plate portion of the bracket connecting member provided in a protruding manner is engaged such that the guide plate portion is slidable in the direction along the lateral surface of the battery.

* * * * *